July 5, 1960 F. M. DEMER 2,943,564

PRINTED DATA STORAGE INTERPRETER

Filed Dec. 24, 1957 5 Sheets-Sheet 1

INVENTOR.
FREDERICK M. DEMER
BY
Brumbaugh, Free, Graves & Donohue
his ATTORNEYS.

July 5, 1960 F. M. DEMER 2,943,564

PRINTED DATA STORAGE INTERPRETER

Filed Dec. 24, 1957 5 Sheets-Sheet 2

INVENTOR.
FREDERICK M. DEMER

BY

Brumbaugh, Free, Graves & Donohue his ATTORNEYS.

PRINTED DATA STORAGE INTERPRETER

Filed Dec. 24, 1957 5 Sheets-Sheet 3

INVENTOR.
FREDERICK M. DEMER

BY

Brumbaugh, Free, Graves & Donohue his ATTORNEYS.

INVENTOR.
FREDERICK M. DEMER
BY
Brumbaugh, Free, Graves & Donohue
his ATTORNEYS.

July 5, 1960 F. M. DEMER 2,943,564

PRINTED DATA STORAGE INTERPRETER

Filed Dec. 24, 1957 5 Sheets-Sheet 5

INVENTOR.
FREDERICK M. DEMER

BY Brumbaugh, Free, Graves & Donohue
his ATTORNEYS.

United States Patent Office 2,943,564

Patented July 5, 1960

2,943,564

PRINTED DATA STORAGE INTERPRETER

Frederick M. Demer, Johnson City, N.Y., assignor to International Business Machines Corporation, New York, N.Y., a corporation of New York Filed Dec. 24, 1957, Ser. No. 704,939

9 Claims. (Cl. 101—93)

This invention relates to interpreter mechanisms and particularly to mechanisms for sensing coded digital information and printing such information in legible character form.

In mechanisms of the type to which the present invention relates, it is desired to sense information stored in code in each of a plurality of record cards, for example, and then to print this information directly on each respective card in legible character form. Usually, each card is transported from the sensing station to the printing station during the interval between the reading of the last row of holes on a card and the printing time.

As a result of improvements that have been made in interpreter mechanisms, this interval of time has been reduced while the distance that a card must be transported in travelling from the sensing station to the printing station has been increased. This necessitates variable and high card transport rates and the means required to accomplish this adds to the complexity and cost of the equipment. Further, the usual high operating speeds characteristic of straight parallel mechanisms are not likely to be attained because of card transport difficulties.

It is an object of the invention, accordingly, to provide new and improved interpreter mechanisms that are free from the above-noted deficiencies of the prior art.

A further object of this invention is to provide new and improved interpreter mechanism of the above character which embodies relatively simple and inexpensive means for storing sensed information pending a printing operation.

Another object of the invention is to provide new and improved interpreter mechanism of the above character which enables reasonably high speeds of operation to be achieved at relatively low cost.

Still another object of the invention is to provide interpreter mechanism of the above character which is adaptable for use with a wide variety of sensing and printing means.

These and other objects and advantages of the invention are obtained by providing means for storing the sensed information temporarily, thereby introducing sufficient delay to allow for transport of a card from a sensing station to a printing station. A particular mechanical storage means selected for illustration purposes comprises a tape on which the translated character information is first printed. The tape is arranged, for example, in a loop, or otherwise, to delay its arrival at a second printing station where the information is transferred to a card which is delivered to the second printer in timed relation with the tape.

Figure 1A:
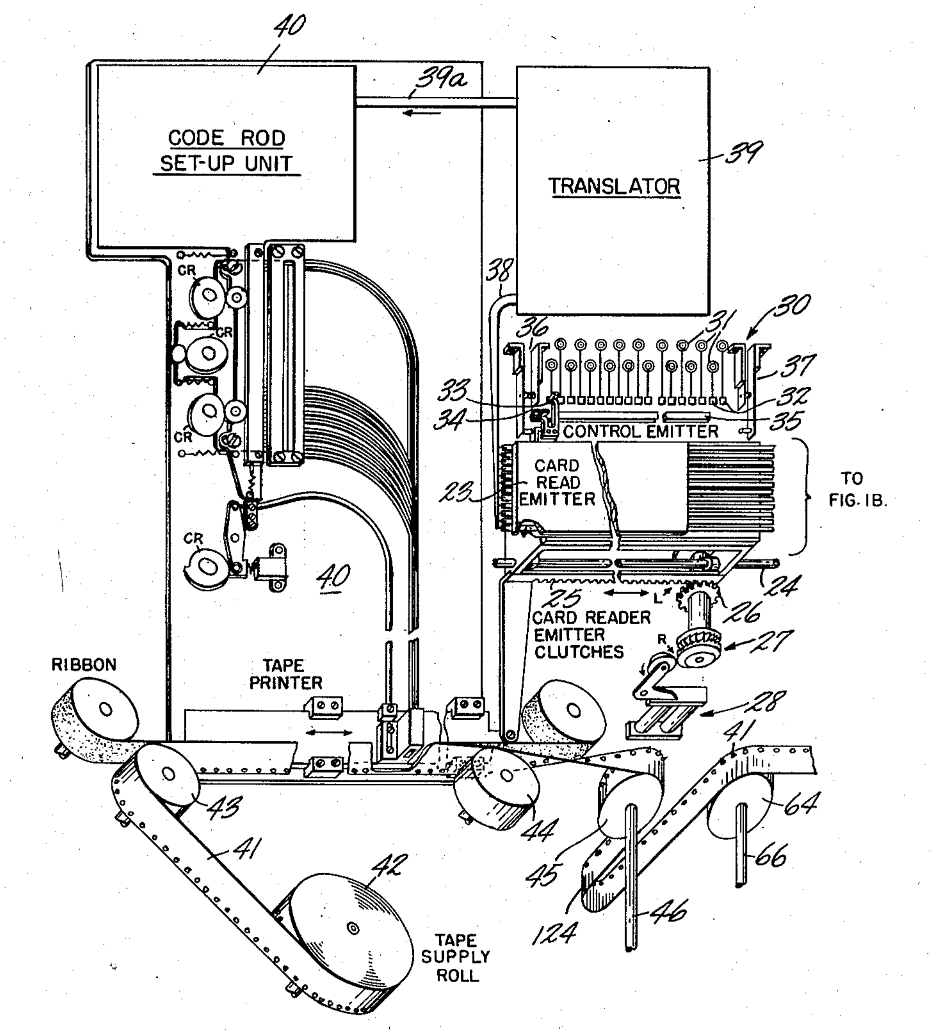
Figure 1B:
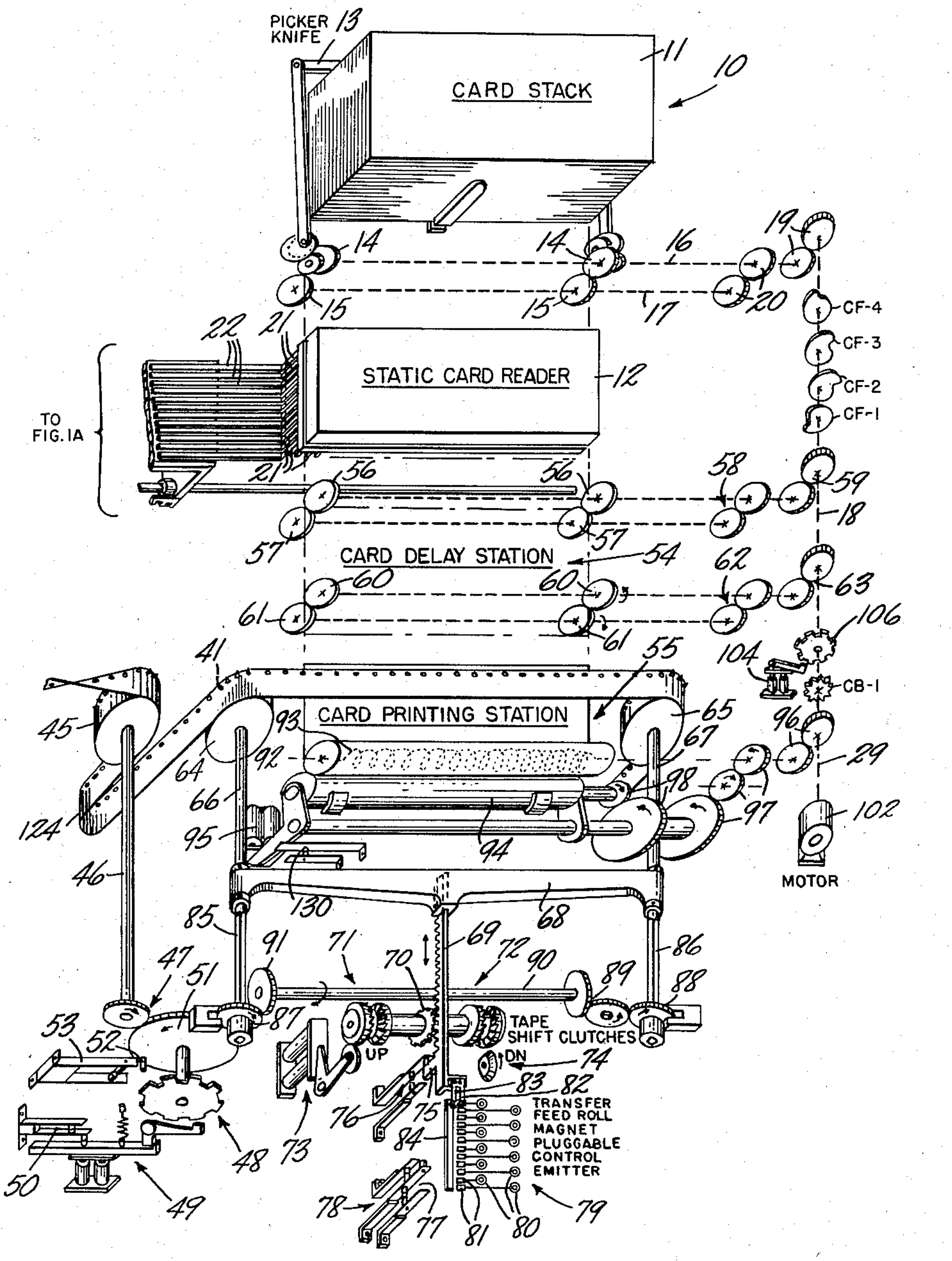
Figure 2A:
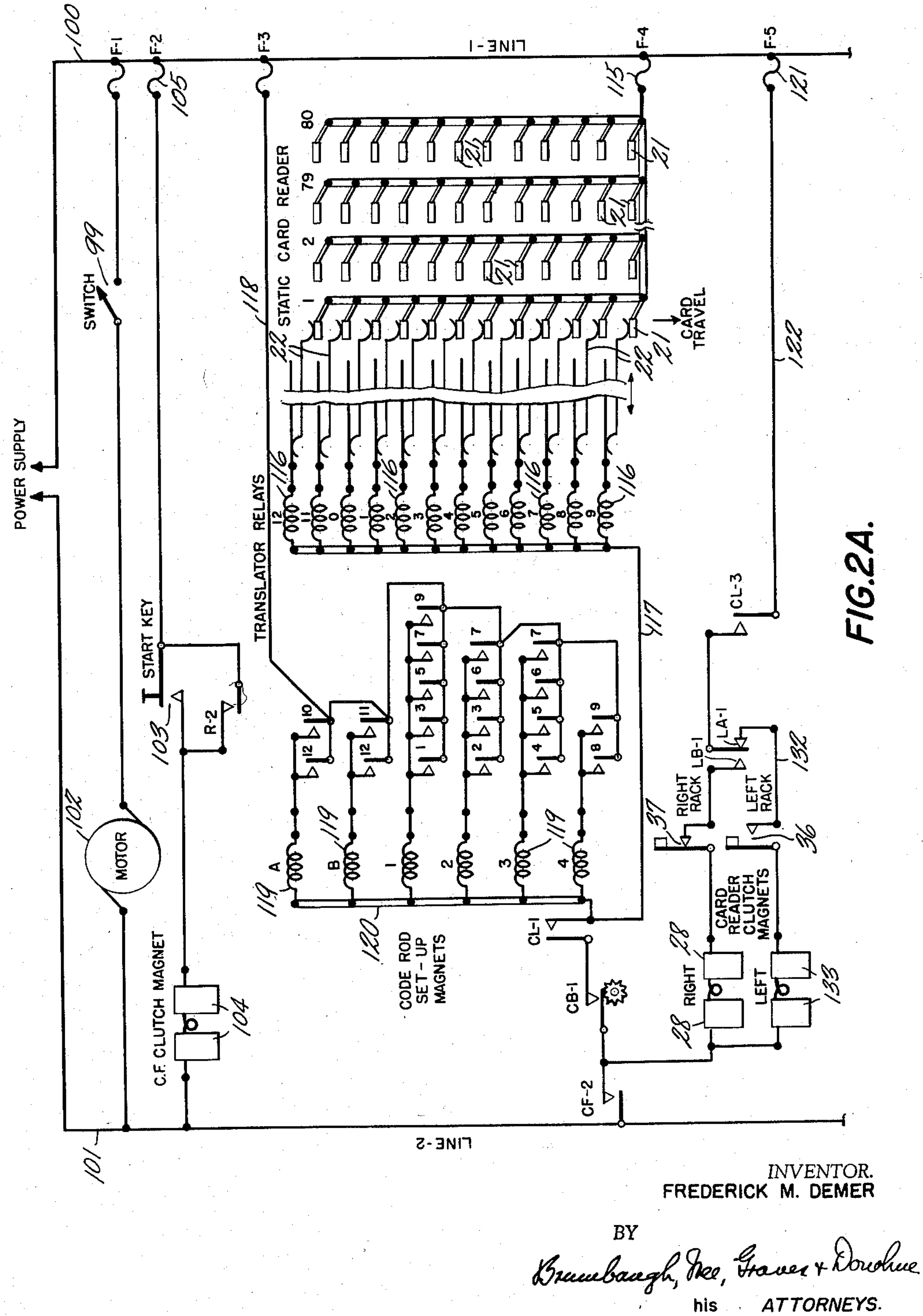
Figure 2B:
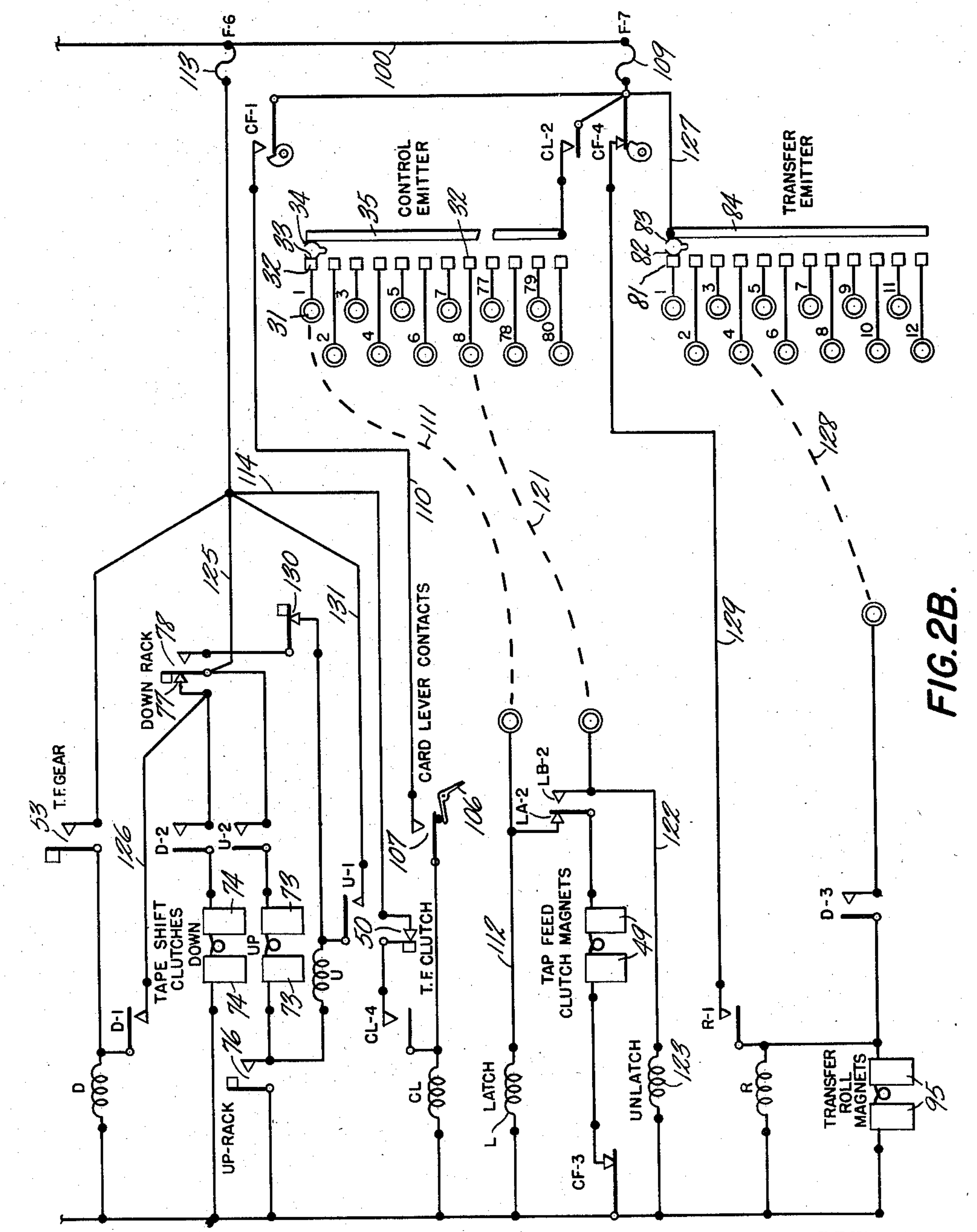
Figure 3:
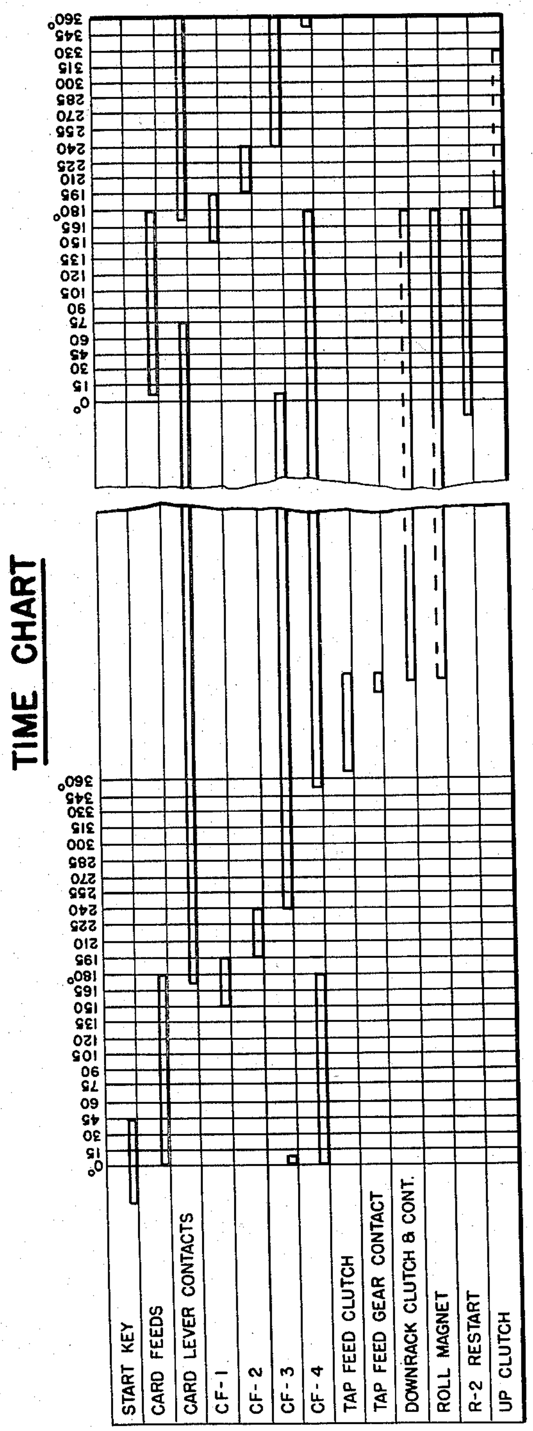

For a better understanding of the invention, reference is made to the following description of a preferred embodiment thereof, taken in connection with the accompanying drawings, in which:

Figures 1A and 1B placed side by side with Figure 1A on the left illustrate diagrammatically an interpreter mechanism constructed according to the invention;

Figures 2A and 2B taken side by side with Figure 2A at the top illustrate a typical control circuit for the mechanism shown in Figures 1A and 1B; and Figure 3 is a time chart showing the operating time sequence for the various components of the interpreter mechanism in Figures 1A and 1B.

Referring now to Figures 1A and 1B of the drawings, one form of interpreter mechanism according to the invention comprises a conventional magazine 10 in which a plurality of record cards 11 is adapted to be stacked. Information is stored on each card in code as, for example, by holes punched through the card at predetermined positions thereon.

The cards 11 are adapted to be fed successively, one at a time to a static card reader 12 by conventional mechanism including picker knife 13 which moves each bottom card sufficiently to be gripped by cooperating feed rolls 14 and 15. The feed rolls 14 and 15 are adapted to be driven by the shafts 16 and 17, respectively, which are mechanically coupled to a main drive shaft 18 through gearing 19 and 20.

The static card reader 12 is conventional and it comprises a plurality of static card brushes 21 one for each possible hole position in a card. Reading of the data carried by a card in the card reader 12 is adapted to be effected by a plurality of reading emitter contacts 22 mounted on a carriage 23 slidable on a guide rail 24. The carriage 23 is adapted to be reciprocated towards and away from the card reader 12 by mechanism including a rack 25 engaging a gear 26 mechanically coupled to the driven elements of left and right card reader clutches, only the latter being shown in Figure 1A.

The right card reader clutch 27 has a driving element adapted to be controlled by a card reader clutch magnet 28 and mechanically coupled to the main drive shaft 29 (Figure 1B) by means (not shown). The left card reader clutch similarly has a driving element adapted to be controlled by a card reader clutch magnet and mechanically coupled to the main drive shaft, none of these elements being visible in Figure 1A.

Operation of the card reader emitter 23 is adapted to be controlled by a conventional control emitter mechanism 30 comprising a plurality of plug receptacles 31 connected, respectively, to a plurality of contacts 32 disposed in a linear array. The contacts 32 are adapted to be engaged selectively by a sliding contact 33 mounted on the carriage 23 and electrically connected to a sliding contact 34 engaging an elongated common contact 35 disposed alongside the contacts 32. Also, left and right limit switches 36 and 37 are positioned on opposite sides of the card reader emitter 30 for actuation by the sliding contacts 33 and 34 at the opposite extremes of travel of the carriage 23.

By the insertion of plug connectors in appropriate ones of the plug receptacles 31, the card reader emitter can be set up to read only the data in predetermined parts of a card in the card reader 12 (Figure 1B), as will be described in greater detail hereinafter.

The information read from the cards is fed over conduit means 38 (Figure 1A) to conventional translator mechanism 39 which converts it to a form suitable for use in a conventional wire type printer 40 to which it is fed over conduit means 39*a*. The printer 40 is adapted to print characters on a tape 41 which is adapted to be advanced from a supply roll 42 over a plurality of idler sprockets 43 and 44 by a driven sprocket 45 (Figure 1B). The sprocket 45 is mounted on a shaft 46 which is adapted to be driven by gearing 47 mechanically coupled to the driving element of a conventional tape feed clutch mechanism 48 having a driving element mechanically coupled to the main drive shaft 29 by means not shown.

The tape feed clutch 48 is adapted to be actuated by a tape feed clutch magnet 49 which also opens normally closed tape feed clutch contacts 50 for purposes of control, as described in greater detail below. Also, the gear 51 carries a pin 52 which is adapted to actuate tape feed gear contacts 53 for control purposes.

After the data has been read from a card in the static card reader 12, the card is adapted to be advanced to a card delay station 54 and from thence to a card printing station 55. This is accomplished by a first set of rolls 56 and 57 adapted to be driven by the gearing 58 and 59 from the drive shaft 18 and by a second set of rolls 60 and 61 similarly adapted to be driven from the shaft 18 by the gearing 62 and 63.

At the card printing station 55, the tape 41 is supported and advanced by spaced apart sprockets 64 and 65 mounted on shafts 66 and 67, respectively, which are adapted to be driven intermittently from the gearing 47 through the tape feed clutch 48 in response to control mechanism to be described later.

In order to enable the tape 41 to be positioned in proper relation to the card so that the desired line will be properly printed thereon, the shafts 66 and 67 are mounted for rotation without axial displacement in a yoke member 68 which carries a rack 69 engaging a gear 70. The gear 70 is adapted to be driven in a forward or reverse direction depending upon whether an up-clutch 71 or a down-clutch 72 is actuated. The up and down clutches 71 and 72 are provided with driving elements which are mechanically coupled to the main drive shaft 29 by means not shown. The clutches 71 and 72 are adapted to be actuated by clutch magnets 73 and 74, respectively, in response to control signals derived as described in greater detail hereinafter.

The rack 69 is provided with an actuator arm 75 which at its upper limit of travel is adapted to close the normally open up rack contacts 76. At its lower extremity of travel, the arm 75 is adapted to open the normally closed down rack contacts 77 and to close the normally open down rack contacts 78.

Within the limits established by the up rack and down rack switch contacts 76 and 77, respectively, the position of the yoke 68 and the portion of the tape 41 between the sprockets 64 and 65 may be controlled by a pluggable control emitter 79. The control emitter 79 comprises a plurality of plug receptacles 80 electrically connected, respectively, to a plurality of contacts 81 arranged in linear array and adapted to be slidably engaged by a contact 82 carried by the rack 69. The rack 69 also carries a contact 83 which is adapted to engage slidably an elongated common contact 84 disposed alongside the row of contacts 81.

In order to provide for advancement of the portion of the tape 41 between the sprockets 64 and 65, the shafts 66 and 67, respectively, are provided with splined ends 85 and 86, respectively, which are slidably received within correspondingly shaped bores in the gears 87 and 88, respectively, for axial relative displacement without relative rotation therebetween. The gear 87 is adapted to be driven by the gear 51 and the gear 88 is adapted to be driven by the gear 87 through the gearing 89, the shaft 90 and the gear 91.

After the portion of the tape 41 between the sprockets 64 and 65 has been properly positioned with respect to a card at the card printing station 55, as described in greater detail below, it and the card are adapted to be fed between a heater roll 92 heated, for example, by an electric heater 93, and a pressure roll 94 which is adapted to be moved into engagement with the heater roll 92 by a transfer roll magnet 95. The pressure roll 94 is adapted to be driven from the main drive shaft 29 through the gearing 96, 97 and 98.

*Operation*

The machine is placed in operation by closing the switch 99 in the typical control circuit shown in Figures 2A and 2B to apply electrical energy from the mains 100 and 101 to the drive motor 102. This will drive the continuously running part of the machine including the main drive shaft 29, the driving elements of the clutches 71, 72 and 48, a contact breaker cam CB (Figure 1B), the driving elements of the card reader emitter clutches (i.e., 27), and the tape printer (Figure 1A).

Operation of a card interpreting cycle is initiated by closing the start key 103 (Figure 2A) to connect the card feed clutch magnet 104 to the power mains 100 and 101 through a fuse 105. This trips the card feed clutch 106 (Figure 1B) coupling the shaft 18 to the main drive shaft 29. The shaft 18 now drives the card picker knife 13 and the card feed rolls 14 and 15 through the gearing 19 and 20. Also, the cams CF–1, CF–2, CF–3 and CF–4 (Figures 1B, 2A and 2B) begin rotating at this time. At each cycle of the card feed, a card will move from one station to the next station, that is from the magazine 10 to the static reader 12, from the static reader 12 to the delay station 54, from the delay station 54 to the card printing station 55, or from the card printing station to the stacker.

When a card enters the static reader station 10, it depresses a card lever 106 (Figure 2B), closing the card lever contacts 107. Since the card feed contact cam CF–1 is closed at this time, as indicated on the time chart in Figure 3, an energizing circuit is completed for the card lever relay CL (Figure 2B). This circuit is traced from the power line 104 through a fuse 109, the closed card feed cam contacts CF–1, the conductor 110, the closed card lever contacts 107, and the card lever relay CL to the power line 101. Energization of the relay CL closes its contacts CL–1, CL–2, CL–3 and CL–4 (Figures 2A and 2B).

With the closing the contacts CL–2, a circuit is completed from the power line 100 through the fuse 109, the closed contacts CL–2, the control emitter common contact 35, the control emitter brushes 34 and 33, the first control emitter contact 32 and the plug receptacle 31 corresponding thereto, the plug wire 111, the conductor 112 and the latching relay L to the power line 101. The latching relay L is now energized, opening its normally closed contacts LA–1 and LA–2 and closing its normally open contacts LB–1 and LB–2, respectively.

With the closing of the contacts CL–4 (Figure 2B) of the card lever relay CL, a holding circuit for the latter relay is completed from the power line 100 through a fuse 113, a conductor 114, the normally closed tape feed clutch contacts 50 (Figures 1B and 2B), the now closed contacts CL–4 and the card lever relay CL to the power line 101.

A short time later, as indicated by the time chart of Figure 3, the card feed cam CF–2 (Figure 2A) closes. This completes a circuit which is traced from the power line 100 through a fuse 115, the static card brushes 21, the brushes 22 on the card emitter carriage 23 (for any punched holes in the card) (Figures 1A, 1B and 2A), the translator coils 116 in the translator 39 (for any punched holes in the card) (Figure 1B), the conductor 117, the closed card lever contacts CL–1, the closed contacts CB–1 of the contact breaker arm, the card feed cam contacts CF–2 to the power line 101.

Any translator relays in the translator mechanism 39 which pick up will complete circuits as follows: from the power line 100 (Figure 2A) through the conductor 118, the translator relay contacts corresponding to any of the relays 116 that are energized, the corresponding code rod set-up magnets 119, the common terminal 120, the closed card lever contacts CL–1, the closed contacts CB–1 and the closed card feed cam contacts CF–2 to the power line 101.

The closing of the card feed cam contacts CF–2 (Figure 2A) completes another circuit which is traced from the line 100 through a fuse 121, a conductor 122, the closed card lever contacts CL–3, the now closed tape feed clutch contacts LB–1, the closed right rack contacts 37 on the control emitter 30 (Figure 1A), the card reader emitter right clutch magnet 28, and the closed card feed cam contacts CF–2 to the power line 101.

The card feed contacts CF–3 do not close until after the contacts LA–2 have been opened so that no circuit is completed to the tape feed clutch magnet 49 at this time.

The teeth of the card reader clutch 27 (Figures 1A and 1B) are now engaged so that the card reader emitter 23 carriage begins to move to the right, sliding the card reader emitter brushes 22 across their respective spots and the control emitter brushes 33 and 34 across their respective contacts 32 and 35, respectively. The printer 40 is timed to print one cycle point after the set up has been made and while a new reading is being taken and translated from the second card column.

The control emitter 30 and the card emitter 23 will continue to move until the control emitter movable contact 33 reaches the second plugged position, say, the eighth position, (Figures 1A and 2B). A circuit is now completed which is traced from the power line 101 (Figure 2B) through the fuse 109, the closed card lever contacts CL–2, the common contact 35 of the control emitter 30 (Figures 1A and 2A), the control emitter brushes 34 and 33, the contact 32 corresponding to the eighth position, a plug wire 121, the now closed contacts LB–2 of the latch relay L, the tape feed clutch magnet 49 (Figures 1B and 2B), and the closed card feed cam contacts CF–3 to the power line 101.

A circuit is also completed from the plug wire 121 through the conductor 122 and the unlatch magnet 123 to the power line 101. The unlatch magnet 123 is a slower acting magnet than the tape feed clutch magnet 49 so as to give the latter time to operate before the latch relay contacts LA–1, LB–1, LA–2, LB–2 are restored to their initial positions (shown in Figures 2A and 2B).

When the tape feed clutch magnet 49 (Figures 1B and 2B) unlatches, its armature permits the clutch contacts 50 to open, thereby breaking the holding circuit for the card lever relay CL and opening its contacts CL–1, CL–2, CL–3 and CL–4. The opening of the contacts CL–1 (Figure 2A) opens the code rod set up magnets in the printer 40 and the translator relay magnet circuits in the translator 39 preventing further reading of the card in the static card reader 12.

The opening of the contacts CL–2 (Figure 2B) opens the circuit to the control emitter common electrode 35, deenergizing the unlatch relay 123.

The opening of the contacts CL–3 (Figure 2A) breaks the circuit to the card reader clutch magnet 28 so that it is deenergized, stopping the card reader emitter 23 at the eighth position (Figure 1A).

The sprockets 45, 64 and 65 are now driven and will feed the printed portion of the tape into a loop 124 (Figure 1B) where it will remain for one cycle. Just before the end of the tape feed cycle, the pin 52 in the tape feed gear 51 will momentarily close the tape gear contacts 53 (Figures 1B and 2B). This will complete a circuit which is traced from the line 100 through the fuse 113, the closed tape feed gear contacts 53, and the down tape shift relay D to the power line 101. Energization of the relay D closes its contacts D–1, D–2 and D–3.

Upon closing of the contacts D–1, a holding circuit for the relay D is completed from the power line 101 through the fuse 113, the conductor 125, the normally closed down rack contacts 77 (Figures 1B and 2B), the conductor 126, and the now closed contacts D–1 and the relay D to the power line 101.

The closing of the contacts D–2 will complete a circuit which is traced from the power line 100 through the fuse 113, the normally closed down rack contact 77, the now closed contact D–2, and the tape shift down clutch magnet 74 to the power line 101. This circuit will actuate the down clutch 74 (Figure 1B) causing the rack 69 and the yoke 68 to move so as to shift the portion of the tape 41 between the sprockets 64 and 65 downwardly with respect to a card at the card printing station 55 (which feeds bottom edge first). It should be noted here that the first card is still in the reading station 12 (Figure 1B) and the printed portion of the tape is in the loop 124.

As the tape shift rack 69 (Figure 1B) starts to move downwardly, the up rack contact 76 closes (without effect) and the transfer emitter brushes 82 and 83 move over the contacts 81 and 84, respectively, until one of the contacts 81 is reached which is plugged (for example, at the No. 4 position in Figure 2B).

At this time, a circuit is completed from the power line 100 (Figure 2B) through the fuse 109, the conductor 127, the transfer emitter common electrode 84, the emitter brushes 83 and 82, the emitter contact 81 corresponding to the fourth position, the plug wire 128, the closed contacts D–3 and the transfer roll magnet 95 to the power line 101. The completion of this circuit energizes the transfer roll magnet 95 (Figures 1B and 2B) and at the same time energizes the relay R which is in parallel therewith.

Energization of the relay R closes its contacts R–1 and R–2. The closing of the contacts R–1 (Figure 2B) completes a holding circuit for the relay R which is traced from the power line 100 through the fuse 109, the closed card feed cam contacts CF–4 and the conductor 129.

Closing of the contacts R–2 (Figure 2A) forms a shunt around the start key contacts 103 which reenergizes the card feed clutch 104. Several things now happen simultaneously.

First, the card in the reading station 12 (Figure 1B) is advanced by the feed rolls to the delay station 54; the picker knife 13 feeds a new card from the magazine 10 into the reading station 12; the transfer roll 94 is raised to contact the heat transfer roll 92; and the portion of the tape 41 between the sprockets 64 and 65 is fed downward and through the transfer rolls 92 and 94 until the arm 75 on the rack 69 opens the down rack contacts 77, thereby disconnecting the tape shift down clutch 74 and the relay D (Figure 2B). The rack 69 (Figure 1B) will remain at this position until the card feed cam contacts CF–4 open at the 180° position in the card feed cycle, as indicated in the time chart of Figure 3. When this happens, the relay R and the transfer roll magnets 95 are deenergized permitting the transfer feed roll 94 (Figure 1B) to drop to its initial position.

As the transfer feed roll 94 drops to its initial position, it closes the normally open contacts 130 (Figures 1B and 2B) completing a circuit which is traced from the line 100 through the fuse 113, the conductor 125, the now closed down rack contacts 78, the now closed transfer roll contacts 130, the U-relay, and the now closed up rack contact 76 to the power line 101. This energizes the relay U closing its contacts U–1 and U–2.

The closing of the relay contacts U–1 provides a holding circuit for the relay U through the conductor 131 and the fuse 113 to the power line 100.

Upon closure of the contacts U–2, a circuit is completed which is traced from the power line 100 through the fuse 113, the conductor 125, the now closed contacts U–2, the tape shift up clutch 73 (Figures 1B and 2B), and the now closed up rack contact 76 to the power line 101. This energizes the tape shift up clutch magnet 73, engaging the teeth of the clutch 71 and driving the rack 69 in the up direction carrying the tape 41 to its normal position.

At the start of its movement, the actuator arm 75 (Figure 1B) will permit the down rack contact 78 to open and will cause the down rack contacts 77 to be closed. Then, when the rack 69 reaches the upper limit of its travel, the actuator arm 75 will open the contact 76, deenergizing the relay U and disengaging the teeth of the up-tape shift clutch 71 and stopping the rack 69 with the emitter brush 83 on the contact 81 representing the "one" position.

The return travel time of the rack 69 overlaps the feeding time of the second card from the stack as indicated by the time chart of Figure 3.

The operation of the machine on the second cycle differs from that of the first cycle in that the reading and control emitter brushes 22 and 31, respectively (Figures 1A and 1B) begin sensing from the eighth position where they were left as explained above. The second card now in the static card reader 12, therefore, will be read in reverse, the emitters starting the reading on column 8 and stopping on column 1.

When the second card reaches the card lever 106 (Figure 2B) closing its contacts 107 to energize the card lever relay CL in the manner described above, the closing of its contacts CL–3 (Figure 2A) will complete a circuit which is traced from the line 100 through the fuse 121, the closed card lever relay contacts CL–3, the normally closed latch relay contacts LA–1, the conductor 132, the now closed left rack contacts 36 (Figures 1A and 2A), the left card reader clutch magnet 133, and the now closed card feed cam contacts CF–2 to the power line 101. Actuation of the left card reader clutch (Figure 1A) will drive the rack 25 in the reverse direction, that is from right to left until the control emitter brush 33 reaches the contact 32 representing the No. 1 position.

At this time, a circuit will be completed from the power line 100 through the fuse 109 (Figure 2B), the now closed card lever contact CL–2, the common contact 35 of the control emitter (Figure 1A), the brushes 34 and 33, the contact 32 corresponding to the No. 1 position, the plug wire 111, the conductor 112 and the latching relay L to the power line 101. This energizes the relay L and transfers its contacts LA–1, LB–1, and LA–2, LB–2.

When the card feed cam contacts CF–3 close, a circuit is completed from the plug wire 111 through the normally closed contacts LA–2 of the latch relay L, and the tape feed clutch magnet 49 to the power line 101 so that the tape feed clutch magnet 49 is energized.

The latch magnet L is slower acting than the tape feed clutch magnet 49 so that the clutch 48 is engaged before the latching relay contacts LA–1, LB–1, LA–2, LB–2 are transferred. From this point on, the operation is the same as for the first card with the exception that there are now two printed sections of tape in the loop 124 (Figure 1B); the first card has arrived at the printing station 55; and the second card has arrived at the relay station 54.

After the printing of the third card, the tape 41 (Figure 1B) will advance so that the first printed section is over the first card in the printing station 55. The tape and the card will now be rolled through the pressure and heat transfer rolls 92 and 94 transferring the printed information from the tape to the card.

Shifting of the tape from its normal position downward on the card in advance of the card movement provides for transfer of the print to any desired line on the card.

The invention thus provides novel and effective interpreter mechanism for reading coded data from cards and utilizing the data thus obtained to print characters on the cards. By printing the characters first on tape and subsequently transferring the printed characters to the cards, it is possible to have overlapping reading, printing and transferring operations so that fairly fast operation can be secured at relatively low cost.

The specific embodiment described above in detail is merely illustrative and numerous modifications in form and detail are possible within the spirit of the invention. The invention, therefore is intended to cover all such modifications as fall within the scope of the accompanying claims.

I claim:

1. In interpreter apparatus for printing information sensed from coded data on cards the combination of means at a first station for sensing coded data on a card, means responsive to said sensing means for temporarily storing the information represented by said sensed coded data in the form of transferable printed characters on a record strip, a second station from said first station and means at said second station for effecting transfer of said stored information to said card in the form of visible characters.

2. In interpreter apparatus for printing information sensed from coded data on cards, the combination of means at a first station for sensing coded data on a card, means responsive to said sensing means for temporarily storing information represented by said sensed coded data in the form of visible and transferable printed characters on a record strip, a second station spaced from said first station, and means at said second station for effecting transfer of said stored information to said card.

3. In interpreter apparatus for printing information sensed from coded data on cards, the combination of means for sensing data on a card to produce signals representing information carried thereby, means responsive to said signals for storing said information temporarily in the form of transferable printed characters on a record strip, means for positioning said strip to bring the characters thereon adjacent said card, and means for effecting transfer of said characters from said record strip to said card.

4. In interpreter apparatus for printing information sensed from coded data on cards, the combination of means for sensing a card to produce signals representing information carried thereby, means responsive to said sensing means for printing transferable characters on a record strip in timed relation to the operation of said sensing means, means operable in timed relation to said printing means for positioning said record strip to bring said printed characters thereon adjacent a portion of said card, and means for effecting transfer of said printed characters to said card.

5. In interpreter apparatus for printing information sensed from coded data on cards, the combination of means for transporting cards successively one at a time to a plurality of stations, sensing means at one of said stations for sensing coded data on each card while at said station, means responsive to said sensing means for temporarily storing information represented by data sensed from cards in the form of transferable printed characters at spaced apart locations along a record strip, means for advancing said record strip to another of said stations, means at said another station for positioning said record strip to bring printed characters thereon adjacent the card from which they were derived, and means for effecting transfer of said characters from said record strip to said last-named card.

6. In interpreter apparatus for printing information from coded data on cards, the combination of means for transporting cards successively one at a time to a plurality of stations, means movable successively in forward and reverse directions to sense data on successive cards at one of said stations, adjustable means limiting said sensing means to selected data on the cards, means responsive to said sensing means for printing on successive portions of a record strip transferable printed characters represented by sensed coded data from successive cards, respectively, means for advancing said record strip in timed relation to the transport of said cards to said successive stations to bring the printed characters on said successive portions of said strip to another of said stations when the respective cards from which said characters were derived are at said another station, means for positioning each said portion in character transferring relation to its corresponding card, and means for effecting transfer of the printed characters on each said portion to the corresponding card.

7. In interpreter apparatus for printing information from coded data on cards, the combination of means for transporting cards successively one at a time to a plurality of stations, sensing means at one of said stations for sensing coded data on each card while at said station, means responsive to said sensing means for temporarily storing information represented by data sensed from cards in the form of transferable printed characters at spaced apart locations along a record strip, means for advancing said record strip to another of said stations, means for positioning said record strip to bring printed characters thereon adjacent the card from which they were derived, means for urging said record strip and card together under heat and pressure to transfer characters from the record strip to the card, and means for restoring said positioning means and said urging means to initial positions.

8. In interpreter apparatus for printing information from coded data on cards, the combination of means for transporting cards successively one at a time to a plurality of stations, means movable successively in forward and reverse directions to sense data on successive cards at one of said stations, adjustable means limiting said sensing means to selected data on the cards, means responsive to said sensing means for printing on successive portions of a record strip transferable printed characters represented by sensed coded data from successive cards, respectively, means for advancing said record strip in time relation to the transport of said cards to said successive stations to bring the printed characters on said successive portions of said strip to another of said stations when the respective cards from which said characters were derived are at said another station, means at said another station for supporting said strip portions successively, said supporting means being movable forwardly and reversely of the direction of transport of said cards, means including said supporting means for advancing said tape portions successively with the corresponding cards under heat and pressure to transfer characters from each record strip portion to each corresponding card, and means for restoring said record strip supporting means to an initial position after each character transferring operation.

9. In interpreter apparatus for printing information from coded data on cards, the combination of a magazine for cards, means for transporting cards successively one at a time from said magazine to a reader station, a delay station and a printing station, reciprocable sensing means movable in one direction to sense coded data carried by a card at said reader station and movable in the reverse direction to sense coded data carried by the next succeeding card to appear at said reader station, adjustable means controlling said sensing means to sense selected coded data carried by a card at said reader station, means responsive to said sensing means for printing on successive portions of a record strip transferable characters represented by coded data sensed from successive cards, respectively, spaced apart means supporting said record strip at said printing station, means adapted to advance said record strip periodically after a printing operation to bring the portion of said record strip carrying characters represented by coded data on a card to said printing station in timed relation to the arrival of said last-named card thereat, adjustable means operable to control the positional relation of a record strip portion at said printing station with regard to the corresponding card, and reciprocable means for advancing said record strip portion and the corresponding card under heat and pressure and in printing relation to transfer characters from the record strip to the card, and for returning said record strip portion to an initial position.

References Cited in the file of this patent

UNITED STATES PATENTS

| | | |
|---|---|---|
| 1,750,191 | Pierce | Mar. 11, 1930 |
| 2,053,063 | Bryce | Sept. 1, 1936 |
| 2,228,330 | Torkelson | Jan. 14, 1941 |
| 2,258,106 | Bryce | Oct. 7, 1941 |
| 2,278,118 | Pitman | Mar. 31, 1942 |
| 2,282,737 | Mills | May 12, 1942 |
| 2,567,134 | Stuivenberg | Sept. 4, 1951 |
| 2,692,551 | Potter | Oct. 26, 1954 |
| 2,704,024 | Ferry | Mar. 15, 1955 |
| 2,811,102 | Devol | Oct. 29, 1957 |
| 2,838,993 | Hinrichs | June 17, 1958 |
| 2,844,094 | Gruver | July 22, 1958 |